United States Patent
Rothman et al.

(10) Patent No.: US 6,429,563 B1
(45) Date of Patent: Aug. 6, 2002

(54) MOUNTING DEVICE FOR ROTATING ELECTRIC MACHINES

(75) Inventors: Bengt Rothman; Ivan Jonas; Kenneth Lundquist; Kent Engvall; Mats Leijon, all of Vasteras (SE)

(73) Assignee: ABB AB, Vasteras (SE)

(*) Notice: Subject to any disclaimer, the term of this patent is extended or adjusted under 35 U.S.C. 154(b) by 0 days.

(21) Appl. No.: 09/355,822

(22) PCT Filed: Feb. 2, 1998

(86) PCT No.: PCT/SE98/00167
§ 371 (c)(1),
(2), (4) Date: Oct. 22, 1999

(87) PCT Pub. No.: WO98/34322
PCT Pub. Date: Aug. 6, 1998

(30) Foreign Application Priority Data

Feb. 3, 1997 (SE) ............................................. 9700357
Nov. 28, 1997 (SE) ............................................. 9704427

(51) Int. Cl.$^7$ ............................ H02K 1/00; H02K 3/00
(52) U.S. Cl. ....................... 310/149; 310/180; 310/214; 310/215; 310/216; 310/218; 310/254
(58) Field of Search ................................. 310/179, 180, 310/254–258, 259; 174/13–33

(56) References Cited

U.S. PATENT DOCUMENTS

| 681,800 A | 9/1901 | Lasche |
| 847,008 A | 3/1907 | Kitsee |

(List continued on next page.)

FOREIGN PATENT DOCUMENTS

| AT | 399790 | 7/1995 |

(List continued on next page.)

OTHER PUBLICATIONS

A test installation of a self–tuned ac filter in the Konti–Skan 2 HVDC link; T. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp. 64–70.

(List continued on next page.)

*Primary Examiner*—Elvin Enad
(74) *Attorney, Agent, or Firm*—Oblon, Spivak, McClelland, Maier & Neustadt, P.C.

(57) ABSTRACT

The present invention relates to a mounting device (80) for reducing short-circuiting forces that are transmitted from a stator core to a stator body in a rotating electric machine comprising a stator with windings drawn through slots in the stator, wherein the stator core is composed of a number of packs (82), each of which includes a number of metal sheets, or of a number of metal sheets, each pack (82) or metal sheet having two identical grooves (84) arranged for cooperation with wedge members (86) designed to join together packs (82) or metal sheets, and wherein the stator body comprises beams (88), each connected to a wedge member (86). The mounting device (80) also comprises a connector (90) arranged through the beam (88) and secured in the wedge member (86) in order to connect the beam (88) and wedge member (86) in such a manner as to permit sliding between the wedge member (86) and the beam (88) in the event of short-circuiting. The windings also consist of high-voltage cable (10).

15 Claims, 2 Drawing Sheets

U.S. PATENT DOCUMENTS

| | | |
|---|---|---|
| 1,304,451 A | 5/1919 | Burnham |
| 1,418,856 A | 6/1922 | Williamson |
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,988,622 A * | 10/1976 | Starcevic ..................... 310/91 |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss ..................... 310/254 |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |

| Patent No. | | Date | Inventor |
|---|---|---|---|
| 4,208,597 A | | 6/1980 | Mulach et al. |
| 4,228,375 A | * | 10/1980 | Beermann et al. .......... 310/214 |
| 4,229,721 A | | 10/1980 | Koloczek et al. |
| 4,238,339 A | | 12/1980 | Khutoretsky et al. |
| 4,239,999 A | | 12/1980 | Vinokurov et al. |
| 4,245,182 A | | 1/1981 | Aotsu et al. |
| 4,246,694 A | | 1/1981 | Raschbichler et al. |
| 4,255,684 A | | 3/1981 | Mischler et al. |
| 4,258,280 A | | 3/1981 | Starcevic |
| 4,262,209 A | | 4/1981 | Berner |
| 4,274,027 A | | 6/1981 | Higuchi et al. |
| 4,281,264 A | | 7/1981 | Keim et al. |
| 4,292,558 A | | 9/1981 | Flick et al. |
| 4,307,311 A | | 12/1981 | Grozinger |
| 4,308,476 A | | 12/1981 | Schuler |
| 4,308,575 A | | 12/1981 | Mase |
| 4,310,966 A | | 1/1982 | Brietenbach |
| 4,314,168 A | | 2/1982 | Breitenbach |
| 4,317,001 A | | 2/1982 | Silver et al. |
| 4,320,645 A | | 3/1982 | Stanley |
| 4,321,426 A | | 3/1982 | Schaeffer |
| 4,321,518 A | | 3/1982 | Akamatsu |
| 4,330,726 A | | 5/1982 | Albright et al. |
| 4,337,922 A | | 7/1982 | Streiff et al. |
| 4,341,989 A | | 7/1982 | Sandberg et al. |
| 4,347,449 A | | 8/1982 | Beau |
| 4,347,454 A | | 8/1982 | Gellert et al. |
| 4,353,612 A | | 10/1982 | Meyers |
| 4,357,542 A | | 11/1982 | Kirschbaum |
| 4,360,748 A | | 11/1982 | Raschbichler et al. |
| 4,361,723 A | | 11/1982 | Hvizd, Jr. et al. |
| 4,365,178 A | | 12/1982 | Lexz |
| 4,367,425 A | | 1/1983 | Mendelsohn et al. |
| 4,367,890 A | | 1/1983 | Spirk |
| 4,368,418 A | | 1/1983 | Demello et al. |
| 4,369,389 A | | 1/1983 | Lambrecht |
| 4,371,745 A | | 2/1983 | Sakashita |
| 4,384,944 A | | 5/1983 | Silver et al. |
| 4,401,920 A | | 8/1983 | Taylor et al. |
| 4,432,029 A | | 2/1984 | Lundqvist |
| 4,437,464 A | | 3/1984 | Crow |
| 4,484,106 A | | 11/1984 | Taylor et al. |
| 4,490,651 A | | 12/1984 | Taylor et al. |
| 4,508,251 A | | 4/1985 | Harada et al. |
| 4,510,077 A | | 4/1985 | Elton .......................... 310/254 |
| 4,520,287 A | | 5/1985 | Wang et al. |
| 4,571,453 A | | 2/1986 | Takaoka et al. |
| 4,615,778 A | | 10/1986 | Elton |
| 4,622,116 A | | 11/1986 | Elton et al. |
| 4,634,909 A | * | 1/1987 | Brem .......................... 310/91 |
| 4,652,963 A | | 3/1987 | Fahlen |
| 4,656,316 A | | 4/1987 | Meitsch |
| 4,723,083 A | | 2/1988 | Elton |
| 4,724,345 A | | 2/1988 | Elton et al. |
| 4,732,412 A | | 3/1988 | van der Linden et al. |
| 4,761,602 A | | 8/1988 | Leibovich |
| 4,771,168 A | | 9/1988 | Gundersen et al. |
| 4,859,989 A | | 8/1989 | McPherson |
| 4,864,266 A | | 9/1989 | Feather et al. |
| 4,883,230 A | | 11/1989 | Lindstrom |
| 4,890,040 A | | 12/1989 | Gundersen |
| 4,894,284 A | | 1/1990 | Yamanouchi et al. |
| 4,914,386 A | | 4/1990 | Zocholl |
| 4,918,347 A | | 4/1990 | Takaba |
| 4,918,835 A | | 4/1990 | Wcislo et al. |
| 4,924,342 A | | 5/1990 | Lee |
| 4,926,079 A | | 5/1990 | Niemela et al. |
| 4,942,326 A | | 7/1990 | Butler, III et al. |
| 4,949,001 A | | 8/1990 | Campbell |
| 4,982,147 A | | 1/1991 | Lauw |
| 4,994,952 A | | 2/1991 | Silva et al. |
| 4,997,995 A | | 3/1991 | Simmons et al. |
| 5,012,125 A | | 4/1991 | Conway |
| 5,023,501 A | * | 6/1991 | Zimmermann .............. 310/258 |
| 5,030,813 A | | 7/1991 | Stanisz |
| 5,036,165 A | | 7/1991 | Elton et al. .................. 310/216 |
| 5,036,238 A | | 7/1991 | Tajima |
| 5,053,663 A | * | 10/1991 | Boer et al. ..................... 310/91 |
| 5,066,881 A | | 11/1991 | Elton et al. .................. 310/254 |
| 5,067,046 A | | 11/1991 | Elton et al. |
| 5,083,360 A | | 1/1992 | Valencic et al. |
| 5,086,246 A | | 2/1992 | Dymond et al. |
| 5,091,609 A | | 2/1992 | Swada et al. |
| 5,094,703 A | | 3/1992 | Takaoka et al. |
| 5,095,175 A | | 3/1992 | Yoshida et al. |
| 5,097,241 A | | 3/1992 | Smith et al. |
| 5,097,591 A | | 3/1992 | Wcislo et al. |
| 5,111,095 A | | 5/1992 | Hendershot |
| 5,124,607 A | | 6/1992 | Rieber et al. |
| 5,136,459 A | | 8/1992 | Fararooy |
| 5,140,290 A | | 8/1992 | Dersch |
| 5,153,460 A | | 10/1992 | Bovino et al. |
| 5,168,662 A | | 12/1992 | Nakamura et al. |
| 5,171,941 A | | 12/1992 | Shimizu et al. |
| 5,182,537 A | | 1/1993 | Thuis |
| 5,187,428 A | | 2/1993 | Hutchison et al. |
| 5,231,249 A | | 7/1993 | Kimura et al. |
| 5,235,488 A | | 8/1993 | Koch |
| 5,246,783 A | | 9/1993 | Spenadel et al. |
| 5,264,778 A | | 11/1993 | Kimmel et al. |
| 5,287,262 A | | 2/1994 | Klein |
| 5,304,883 A | | 4/1994 | Denk |
| 5,305,961 A | | 4/1994 | Errard et al. |
| 5,321,308 A | | 6/1994 | Johncock |
| 5,323,330 A | | 6/1994 | Asplund et al. |
| 5,325,008 A | | 6/1994 | Grant |
| 5,325,259 A | | 6/1994 | Paulsson |
| 5,327,637 A | | 7/1994 | Britenbach et al. |
| 5,341,281 A | | 8/1994 | Skibinski |
| 5,343,139 A | | 8/1994 | Gyugyi et al. |
| 5,355,046 A | | 10/1994 | Weigelt |
| 5,365,132 A | | 11/1994 | Hann et al. |
| 5,387,890 A | | 2/1995 | Estop et al. |
| 5,397,513 A | | 3/1995 | Steketee, Jr. |
| 5,399,941 A | | 3/1995 | Grothaus et al. |
| 5,400,005 A | | 3/1995 | Bobry |
| 5,408,169 A | | 4/1995 | Jeanneret |
| 5,449,861 A | | 9/1995 | Fujino et al. |
| 5,452,170 A | | 9/1995 | Ohde et al. |
| 5,468,916 A | | 11/1995 | Litenas et al. |
| 5,499,178 A | | 3/1996 | Mohan |
| 5,500,632 A | | 3/1996 | Halser, III |
| 5,510,942 A | | 4/1996 | Bock et al. |
| 5,530,307 A | | 6/1996 | Horst |
| 5,533,658 A | | 7/1996 | Benedict et al. |
| 5,534,754 A | | 7/1996 | Poumey |
| 5,545,853 A | | 8/1996 | Hildreth |
| 5,550,410 A | | 8/1996 | Titus |
| 5,583,387 A | | 12/1996 | Takeuchi et al. |
| 5,587,126 A | | 12/1996 | Steketee, Jr. |
| 5,598,137 A | | 1/1997 | Alber et al. |
| 5,607,320 A | | 3/1997 | Wright |
| 5,612,510 A | | 3/1997 | Hildreth |
| 5,642,011 A | * | 6/1997 | Fanning et al. ............. 310/216 |
| 5,663,605 A | | 9/1997 | Evans et al. |
| 5,672,926 A | | 9/1997 | Brandes et al. |
| 5,689,223 A | | 11/1997 | Demarmeis et al. |
| 5,807,447 A | | 9/1998 | Forrest |
| 5,834,699 A | | 11/1998 | Buck et al. |

FOREIGN PATENT DOCUMENTS

| BE | 565063 | 2/1957 |

| | | | | | | |
|---|---|---|---|---|---|---|
| CH | 391071 | 4/1965 | | DE | 4402184 | 8/1995 |
| CH | 266037 | 10/1965 | | DE | 4409794 | 8/1995 |
| CH | 534448 | 2/1973 | | DE | 4412761 | 10/1995 |
| CH | 539328 | 7/1973 | | DE | 4420322 | 12/1995 |
| CH | 646403 | 2/1979 | | DE | 19620906 | 1/1996 |
| CH | 657482 | 8/1986 | | DE | 4438186 | 5/1996 |
| CH | 1189322 | 10/1986 | | DE | 19020222 | 3/1997 |
| DD | 137164 | 8/1979 | | DE | 19547229 | 6/1997 |
| DD | 138840 | 11/1979 | | DE | 468827 | 7/1997 |
| DE | 40414 | 8/1887 | | DE | 134022 | 12/2001 |
| DE | 277012 | 7/1914 | | EP | 049104 | 4/1982 |
| DE | 336418 | 6/1920 | | EP | 0493704 | 4/1982 |
| DE | 372390 | 3/1923 | | EP | 0056580 A1 | 7/1982 |
| DE | 386561 | 12/1923 | | EP | 078908 | 5/1983 |
| DE | 387973 | 1/1924 | | EP | 0120154 | 10/1984 |
| DE | 406371 | 11/1924 | | EP | 0130124 | 1/1985 |
| DE | 425551 | 2/1926 | | EP | 0142813 | 5/1985 |
| DE | 426793 | 3/1926 | | EP | 0155405 | 9/1985 |
| DE | 432169 | 7/1926 | | EP | 0102513 | 1/1986 |
| DE | 433749 | 9/1926 | | EP | 0174783 | 3/1986 |
| DE | 435608 | 10/1926 | | EP | 0185788 | 7/1986 |
| DE | 435609 | 10/1926 | | EP | 0277358 | 8/1986 |
| DE | 441717 | 3/1927 | | EP | 0234521 | 9/1987 |
| DE | 443011 | 4/1927 | | EP | 0244069 | 11/1987 |
| DE | 460124 | 5/1928 | | EP | 0246377 | 11/1987 |
| DE | 482506 | 9/1929 | | EP | 0265868 | 5/1988 |
| DE | 501181 | 7/1930 | | EP | 0274691 | 7/1988 |
| DE | 523047 | 4/1931 | | EP | 0280759 | 9/1988 |
| DE | 568508 | 1/1933 | | EP | 0282876 | 9/1988 |
| DE | 572030 | 3/1933 | | EP | 0309096 | 3/1989 |
| DE | 584639 | 9/1933 | | EP | 0314860 | 5/1989 |
| DE | 586121 | 10/1933 | | EP | 0316911 | 5/1989 |
| DE | 604972 | 11/1934 | | EP | 0317248 | 5/1989 |
| DE | 629301 | 4/1936 | | EP | 0335430 | 10/1989 |
| DE | 673545 | 3/1939 | | EP | 0342554 | 11/1989 |
| DE | 719009 | 3/1942 | | EP | 0221404 | 5/1990 |
| DE | 846583 | 8/1952 | | EP | 0375101 | 6/1990 |
| DE | 875227 | 4/1953 | | EP | 0406437 | 1/1991 |
| DE | 975999 | 1/1963 | | EP | 0439410 | 7/1991 |
| DE | 1465719 | 5/1969 | | EP | 0440865 | 8/1991 |
| DE | 1807391 | 5/1970 | | EP | 0469155 A1 | 2/1992 |
| DE | 2050674 | 5/1971 | | EP | 0490705 | 6/1992 |
| DE | 1638176 | 6/1971 | | EP | 0503817 | 9/1992 |
| DE | 2155371 | 5/1973 | | EP | 0571155 | 11/1993 |
| DE | 2400698 | 7/1975 | | EP | 0620570 | 10/1994 |
| DE | 2520511 | 11/1976 | | EP | 0620630 | 10/1994 |
| DE | 2656389 | 6/1978 | | EP | 0642027 | 3/1995 |
| DE | 2721905 | 11/1978 | | EP | 0671632 | 9/1995 |
| DE | 2824951 | 12/1979 | | EP | 0676777 | 10/1995 |
| DE | 2835386 | 2/1980 | | EP | 0677915 | 10/1995 |
| DE | 2839517 | 3/1980 | | EP | 0684679 | 11/1995 |
| DE | 2854520 | 6/1980 | | EP | 0684682 | 11/1995 |
| DE | 3009102 | 9/1980 | | EP | 0695019 | 1/1996 |
| DE | 2913697 | 10/1980 | | EP | 0732787 | 9/1996 |
| DE | 2920478 | 12/1980 | | EP | 0738034 | 10/1996 |
| DE | 3028777 | 3/1981 | | EP | 0739087 A2 | 10/1996 |
| DE | 2939004 | 4/1981 | | EP | 0740315 | 10/1996 |
| DE | 3006382 | 8/1981 | | EP | 0749190 A2 | 12/1996 |
| DE | 3008818 | 9/1981 | | EP | 0751605 | 1/1997 |
| DE | 209313 | 4/1984 | | EP | 0739087 A3 | 3/1997 |
| DE | 3305225 | 8/1984 | | EP | 0749193 A3 | 3/1997 |
| DE | 3309051 | 9/1984 | | EP | 0780926 | 6/1997 |
| DE | 3441311 | 5/1986 | | EP | 0802542 | 10/1997 |
| DE | 3543106 | 6/1987 | | EP | 0913912 A1 | 5/1999 |
| DE | 2917717 | 8/1987 | | FR | 805544 | 4/1936 |
| DE | 3612112 | 10/1987 | | FR | 841351 | 1/1938 |
| DE | 3726346 | 2/1989 | | FR | 847899 | 12/1938 |
| DE | 3925337 | 2/1991 | | FR | 916959 | 12/1946 |
| DE | 4023903 | 11/1991 | | FR | 1011924 | 4/1949 |
| DE | 4022476 | 1/1992 | | FR | 1126975 | 3/1955 |
| DE | 4233558 | 3/1994 | | FR | 1238795 | 7/1959 |

| | | | | | |
|---|---|---|---|---|---|
| FR | 2108171 | 5/1972 | GB | 2105925 | 3/1983 |
| FR | 2251938 | 6/1975 | GB | 2106306 | 4/1983 |
| FR | 2305879 | 10/1976 | GB | 2106721 | 4/1983 |
| FR | 2376542 | 7/1978 | GB | 2136214 | 9/1984 |
| FR | 2 376 542 | 7/1978 | GB | 2140195 | 11/1984 |
| FR | 2467502 | 4/1981 | GB | 2150153 | 6/1985 |
| FR | 2481531 | 10/1981 | GB | 2268337 | 1/1994 |
| FR | 2556146 | 6/1985 | GB | 2273819 | 6/1994 |
| FR | 2594271 | 8/1987 | GB | 2283133 | 4/1995 |
| FR | 2708157 | 1/1995 | GB | 2289992 | 12/1995 |
| GB | 123906 | 3/1919 | GB | 2308490 | 6/1997 |
| GB | 268271 | 3/1927 | GB | 2332557 | 6/1999 |
| GB | 293861 | 11/1928 | HU | 175494 | 11/1981 |
| GB | 292999 | 4/1929 | JP | 60206121 | 3/1959 |
| GB | 319313 | 7/1929 | JP | 57043529 | 8/1980 |
| GB | 518993 | 3/1940 | JP | 57126117 | 5/1982 |
| GB | 537609 | 6/1941 | JP | 59076156 | 10/1982 |
| GB | 540456 | 10/1941 | JP | 59159642 | 2/1983 |
| GB | 589071 | 6/1947 | JP | 6264964 | 9/1985 |
| GB | 666883 | 2/1952 | JP | 1129737 | 5/1989 |
| GB | 685416 | 1/1953 | JP | 62320631 | 6/1989 |
| GB | 702892 | 1/1954 | JP | 2017474 | 1/1990 |
| GB | 715226 | 9/1954 | JP | 3245748 | 2/1990 |
| GB | 723457 | 2/1955 | JP | 4179107 | 11/1990 |
| GB | 739962 | 11/1955 | JP | 318253 | 1/1991 |
| GB | 763761 | 12/1956 | JP | 424909 | 1/1992 |
| GB | 805721 | 12/1958 | JP | 5290947 | 4/1992 |
| GB | 827600 | 2/1960 | JP | 6196343 | 12/1992 |
| GB | 854728 | 11/1960 | JP | 6233442 | 2/1993 |
| GB | 870583 | 6/1961 | JP | 6325629 | 5/1993 |
| GB | 913386 | 12/1962 | JP | 7057951 | 8/1993 |
| GB | 965471 | 8/1964 | JP | 7264789 | 3/1994 |
| GB | 992249 | 5/1965 | JP | 8167332 | 12/1994 |
| GB | 1024583 | 3/1966 | JP | 7161270 | 6/1995 |
| GB | 1053337 | 12/1966 | JP | 8264039 | 11/1995 |
| GB | 1059123 | 2/1967 | JP | 9200989 | 1/1996 |
| GB | 1103098 | 2/1968 | JP | 8036952 | 2/1996 |
| GB | 1103099 | 2/1968 | JP | 8167360 | 6/1996 |
| GB | 1117401 | 6/1968 | LU | 67199 | 3/1972 |
| GB | 1135242 | 12/1968 | SE | 90308 | 9/1937 |
| GB | 1147049 | 4/1969 | SE | 305899 | 11/1968 |
| GB | 1157885 | 7/1969 | SE | 255156 | 2/1969 |
| GB | 1174659 | 12/1969 | SE | 341428 | 12/1971 |
| GB | 1236082 | 6/1971 | SE | 453236 | 1/1982 |
| GB | 1268770 | 3/1972 | SE | 457792 | 6/1987 |
| GB | 1319257 | 6/1973 | SE | 502417 | 12/1993 |
| GB | 1322433 | 7/1973 | SU | 792302 | 1/1971 |
| GB | 1340983 | 12/1973 | SU | 425268 | 9/1974 |
| GB | 1341050 | 12/1973 | SU | 1019553 | 1/1980 |
| GB | 1365191 | 8/1974 | SU | 694939 | 1/1982 |
| GB | 1395152 | 5/1975 | SU | 955369 | 8/1983 |
| GB | 1424982 | 2/1976 | SU | 1511810 | 5/1987 |
| GB | 1426594 | 3/1976 | WO | WO8202617 | 8/1982 |
| GB | 1438610 | 6/1976 | WO | WO8502302 | 5/1985 |
| GB | 1445284 | 8/1976 | WO | WO9011389 | 10/1990 |
| GB | 1479904 | 7/1977 | WO | WO9012409 | 10/1990 |
| GB | 1493163 | 11/1977 | WO | PCT/DE 90/00279 | 11/1990 |
| GB | 1502938 | 3/1978 | WO | WO9101059 | 1/1991 |
| GB | 1525745 | 9/1978 | WO | WO9101585 | 2/1991 |
| GB | 2000625 | 1/1979 | WO | WO9107807 | 3/1991 |
| GB | 1548633 | 7/1979 | WO | PCT SE 91/00077 | 4/1991 |
| GB | 2046142 | 11/1979 | WO | WO9109442 | 6/1991 |
| GB | 2022327 | 12/1979 | WO | WO 91/11841 | 8/1991 |
| GB | 2025150 | 1/1980 | WO | WO8115862 | 10/1991 |
| GB | 2034101 | 5/1980 | WO | WO 91/15755 | 10/1991 |
| GB | 1574796 | 9/1980 | WO | WO9201328 | 1/1992 |
| GB | 2070341 | 9/1981 | WO | WO9203870 | 3/1992 |
| GB | 2070470 | 9/1981 | WO | WO9321681 | 10/1993 |
| GB | 2071433 | 9/1981 | WO | WO9406194 | 3/1994 |
| GB | 2081523 | 2/1982 | WO | WO9518058 | 7/1995 |
| GB | 2099635 | 12/1982 | WO | WO9522153 | 8/1995 |

| | | | | | | |
|---|---|---|---|---|---|---|
| WO | WO9524049 | 9/1995 | | WO | WO9834248 | 8/1998 |
| WO | WO9622606 | 7/1996 | | WO | WO9834249 | 8/1998 |
| WO | WO9622607 | 7/1996 | | WO | WO9834250 | 8/1998 |
| WO | PCT/CN 96/00010 | 10/1996 | | WO | WO9834309 | 8/1998 |
| WO | WO9630144 | 10/1996 | | WO | WO9834312 | 8/1998 |
| WO | WO9710640 | 3/1997 | | WO | WO9834321 | 8/1998 |
| WO | WO9711831 | 4/1997 | | WO | WO9834322 | 8/1998 |
| WO | WO9716881 | 5/1997 | | WO | WO9834323 | 8/1998 |
| WO | WO 97/29494 | 8/1997 | | WO | WO9834325 | 8/1998 |
| WO | WO9745288 | 12/1997 | | WO | WO9834326 | 8/1998 |
| WO | WO9745847 | 12/1997 | | WO | WO9834327 | 8/1998 |
| WO | WO9745848 | 12/1997 | | WO | WO9834328 | 8/1998 |
| WO | WO9745906 | 12/1997 | | WO | WO9834329 | 8/1998 |
| WO | WO9745907 | 12/1997 | | WO | WO9834330 | 8/1998 |
| WO | WO9745912 | 12/1997 | | WO | WO9834331 | 8/1998 |
| WO | WO9745914 | 12/1997 | | WO | WO 98/40627 | 9/1998 |
| WO | WO9745915 | 12/1997 | | WO | WO9834315 | 10/1998 |
| WO | WO9745916 | 12/1997 | | WO | WO 98/43336 | 10/1998 |
| WO | WO9745918 | 12/1997 | | WO | WO9917309 | 4/1999 |
| WO | WO9745919 | 12/1997 | | WO | WO9917311 | 4/1999 |
| WO | WO9745920 | 12/1997 | | WO | WO9917312 | 4/1999 |
| WO | WO9745921 | 12/1997 | | WO | WO9917313 | 4/1999 |
| WO | WO9745922 | 12/1997 | | WO | WO9917314 | 4/1999 |
| WO | WO9745923 | 12/1997 | | WO | WO9917315 | 4/1999 |
| WO | WO9745924 | 12/1997 | | WO | WO9917316 | 4/1999 |
| WO | WO9745925 | 12/1997 | | WO | WO9917422 | 4/1999 |
| WO | WO9745926 | 12/1997 | | WO | WO9917424 | 4/1999 |
| WO | WO9745927 | 12/1997 | | WO | WO9917425 | 4/1999 |
| WO | WO9745928 | 12/1997 | | WO | WO9917426 | 4/1999 |
| WO | WO9745929 | 12/1997 | | WO | WO9917427 | 4/1999 |
| WO | WO9745930 | 12/1997 | | WO | WO9917428 | 4/1999 |
| WO | WO9745931 | 12/1997 | | WO | WO9917429 | 4/1999 |
| WO | WO9745932 | 12/1997 | | WO | WO9917432 | 4/1999 |
| WO | WO9745933 | 12/1997 | | WO | WO9917433 | 4/1999 |
| WO | WO9745934 | 12/1997 | | WO | WO9919963 | 4/1999 |
| WO | WO9745935 | 12/1997 | | WO | WO9919969 | 4/1999 |
| WO | WO9745936 | 12/1997 | | WO | WO9919970 | 4/1999 |
| WO | WO9745937 | 12/1997 | | WO | PCT/SE 98/02148 | 6/1999 |
| WO | WO9745938 | 12/1997 | | WO | WO9927546 | 6/1999 |
| WO | WO9745939 | 12/1997 | | WO | WO9928919 | 6/1999 |
| WO | WO9747067 | 12/1997 | | WO | WO9928921 | 6/1999 |
| WO | WO9820595 | 5/1998 | | WO | WO 99/28922 | 6/1999 |
| WO | WO9820596 | 5/1998 | | WO | WO9928923 | 6/1999 |
| WO | WO9820597 | 5/1998 | | WO | WO9928924 | 6/1999 |
| WO | WO 98/20598 | 5/1998 | | WO | WO9928925 | 6/1999 |
| WO | WO9820600 | 5/1998 | | WO | WO9928926 | 6/1999 |
| WO | WO 98/20602 | 5/1998 | | WO | WO9928927 | 6/1999 |
| WO | WO9821385 | 5/1998 | | WO | WO9928928 | 6/1999 |
| WO | PCT/FR 98/00468 | 6/1998 | | WO | WO9928929 | 6/1999 |
| WO | WO9827634 | 6/1998 | | WO | WO9928930 | 6/1999 |
| WO | WO9827635 | 6/1998 | | WO | WO9928931 | 6/1999 |
| WO | WO9827636 | 6/1998 | | WO | WO9928934 | 6/1999 |
| WO | WO9829927 | 7/1998 | | WO | WO9928994 | 6/1999 |
| WO | WO9829928 | 7/1998 | | WO | WO9929005 | 6/1999 |
| WO | WO9829929 | 7/1998 | | WO | WO 99/29005 | 6/1999 |
| WO | WO9829930 | 7/1998 | | WO | WO9929008 | 6/1999 |
| WO | WO9829931 | 7/1998 | | WO | WO9929011 | 6/1999 |
| WO | WO9829932 | 7/1998 | | WO | WO9929012 | 6/1999 |
| WO | WO9833731 | 8/1998 | | WO | WO9929013 | 6/1999 |
| WO | WO9833736 | 8/1998 | | WO | WO9929014 | 6/1999 |
| WO | WO9833737 | 8/1998 | | WO | WO9929015 | 6/1999 |
| WO | WO9834238 | 8/1998 | | WO | WO9929016 | 6/1999 |
| WO | WO 98/34239 | 8/1998 | | WO | WO9929017 | 6/1999 |
| WO | WO9834240 | 8/1998 | | WO | WO9929018 | 6/1999 |
| WO | WO9834241 | 8/1998 | | WO | WO9929019 | 6/1999 |
| WO | WO9834242 | 8/1998 | | WO | WO9929020 | 6/1999 |
| WO | WO9834243 | 8/1998 | | WO | WO9929021 | 6/1999 |
| WO | WO9834244 | 8/1998 | | WO | WO9929022 | 6/1999 |
| WO | WO9834245 | 8/1998 | | WO | WO 99/29023 | 6/1999 |
| WO | WO9834246 | 8/1998 | | WO | WO9929024 | 6/1999 |
| WO | WO9834247 | 8/1998 | | WO | WO 99/29025 | 6/1999 |

| | | |
|---|---|---|
| WO | WO9929026 | 6/1999 |
| WO | WO9929029 | 6/1999 |
| WO | WO9929034 | 6/1999 |

OTHER PUBLICATIONS

Analysis of faulted Power Systems; P Anderson, Iowa State University Press / Ames, Iowa, 1973, pp. 255–257.

36–Kv. Generators Arise from Insulation Research; P. Sidler; *Electrical World* Oct. 15, 1932, p. 524.

Oil Water cooled 300 MW turbine generator;L.P. Gnedin et al;*Elektrotechnika*, 1970, pp. 6–8.

J&P Transformer Book 11$^{th}$ Edition;A. C. Franklin et al; owned by Butterworth—Heinemann Ltd, Oxford Printed by Hartnolls Ltd in Great Britain 1983, pp. 29–67.

Transformerboard; H.P. Moser et al; 1979, pp. 1–19.

The Skagerrak transmission—the world's longest HVDC submarine cable link; L Haglof et al of ASEA; ASEA Journal vol. 53, No. 1–2, 1980, pp. 3–12.

Direct Connection of Generators to HVDC Converters: Main Characteristics and Comparative Advantages; J.Arrillaga et al; *Electra* No. 149, 08/ 1993, pp. 19–37.

Our flexible friend article; M. Judge; *New Scientist*, May 10, 1997, pp. 44–48.

In–Service Performance of HVDC Converter transformers and oil–cooled smoothing reactors; G.L. Desilets et al; *Electra* No. 155, Aug. 1994, pp. 7–29.

Transformateurs a courant continu haute tension–examen des specifications; A. Lindroth et al; *Electra* No. 141, Apr. 1992, pp. 34–39.

Development of a Termination for the 77 kV–Class High Tc Superconducting Power Cable; T. Shimonosono et al; IEEE Power Delivery, vol. 12, No. 1, Jan. 1997, pp. 33–38.

Verification of Limiter Performance in Modern Excitation Control Systems; G. K. Girgis et al; IEEE Energy Conservation, vol. 10, No. 3, Sep. 1995, pp. 538–542.

A High Initial response Brushless Excitation System; T. L. Dillman et al; IEEE Power Generation Winter Meeting Proceedings, Jan. 31, 1971, pp. 2089–2094.

Design, manufacturing and cold test of a superconducting coil and its cryostat for SMES applications; A. Bautista et al; IEEE Applied Superconductivity, vol. 7, No. 2, Jun. 1997, pp. 853–856.

Quench Protection and Stagnant Normal Zones in a Large Cryostable SMES; Y. Lvovsky et al; IEEE Applied Superconductivity, vol. 7, No. 2, Jun. 1997, pp. 857–860.

Design and Construction of the 4 Tesla Background Coil for the Navy SMES Cable Test Apparatus; D.W. Scherbarth et al; IEEE Appliel Superconductivity, vol. 7, No. 2, Jun. 1997, pp. 840–843.

High Speed Synchronous Motors Adjustable Speed Drives; ASEA Generation Pamphlet OG 135–101 E, Jan. 1985, pp. 1–4.

Billig burk motar overtonen; A. Felldn; *ERA* (TEKNIK) Aug. 1994, pp. 26–28.

400–kV XLPE cable system passes CIGRE test; ABB Article; ABB Review Sep. 1995, p. 38.

FREQSYN—a new drive system for high power applications;J–A. Bergman et al; ASEA Journal 59, Apr. 1986, pp. 16–19.

Canadians Create Conductive Concrete; J. Beaudoin et al; *Science*, vol. 276, May 23, 1997, p. 1201.

Fully Water–Cooled 190 MVA Generators in the Tonstad Hydroelectric Power Station; E. Ostby et al; BBC Review Aug. 1969, pp. 380–385.

Relocatable static var compensators help control unbundled power flows; R. C. Knight et al; *Transmission & Distribution*, Dec. 1996, pp. 49–54.

Investigation and Use of Asynchronized Machines in Power Systems*; N.I.Blotskii et al; *Elektrichestvo*, No. 12, 1–6, 1985, pp. 90–99.

Variable–speed switched reluctance motors; P.J. Lawrenson et al; IEE proc, vol. 127, Pt.B, No.4, Jul. 1980, pp. 253–265.

Das Einphasenwechselstromsystem hoherer Frequenz; J.G. Heft; Elektrische Bannen eb; Dec. 1987, pp. 388–389.

Power Transmission by Direct Current;E. Uhlmann;ISBN 3–540–07122–9 Springer–Verlag, Berlin/Heidelberg/New York; 1975, pp. 327–328.

Elektriska Maskiner; F. Gustavson; Institute for ElkreaftekniIk, KTH; Stockholm, 1996, pp. 3–6–3–12.

Die Wechselstromtechnik; A. Cour' Springer Verlag, Germany; 1936, pp. 586–598.

Insulation systems for superconducting transmission cables; O. Toennesen; Nordic Insulation Symposium, Bergen, 1996, pp. 425–432.

MPTC: An economical alternative to universal power flow controllers; N. Mohan; EPE 1997, Trondheim, pp. 3.1027–3.1030.

Lexikon der Technik; Luger; Band 2, Grundlagen der Elektrotechnik und Kerntechnik, 1960, p. 395.

Das Handbuch der Lokomotiven ( hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp. 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp. 1–13.

Regulating transformers in power systems—new concepts and applications; E. Wirth et al; ABB Review Apr. 1997, pp. 12–20.

Transforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp. 91–98.

Performance Characteristics of a Wide Range Induction Type Frequency Converter; G.A. Ghoneem; Ieema Journal, Sep. 1995, pp. 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp. 1–65.

Design and manufacture of a large superconducting homopolar motor; A.D. Appleton; IEEE Transactions on Magnetics, vol. 19, No. 3, Part 2, May 1983, pp. 1048–1050.

Application of high temperature superconductivy to electric motor design; J.S. Edmonds et al; IEEE Transactions on Energy Conversion Jun. 1992, No. 2, pp. 322–329.

Power Electronics and Variable Frequency Drives; B. Bimal; IEEE industrial Electronics—Technology and Applications, 1996, p. 356.

Properties of High Plymer Cement Mortar; M. Tamai et al; *Science & Technology in Japan*, No. 63 ; 1977, pp. 6–14.

Weatherability of Polymer–Modified Mortars after Ten–Year Outdoor Exposure in Koriyama and Sapporo; Y. Ohama et al; *Science & Technology in Japan* No. 63; 1977, pp. 26–31.

SMC Powders Open New Magnetic Applications; M. Persson (Editor); *SMC Update*, vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, pp. 1882–1888.

Low–intensy laser–triggering of rail–gaps with magnesium–aerosol switching–gases; W. Frey; 11th International Pulse Power Conference, 1997, Baltimore, USA Digest of Technical Papers, pp. 322–327.

Shipboard Electrical Insulation; G. L. Moses, 1951, pp. 2&3.

ABB Elkrafthandbok; ABB AB; 1988 ; pp. 274–276.

Elkraft teknisk Handbok, 2 Elmaskiner; A. Alfredsson et al; 1988, pp. 121–123.

High Voltage Cables in a New Class of Generators Powerformer; M. Leijon et al; Jun. 14, 1999; pp. 1–8.

Ohne Tranformator direkt ins Netz; Owman et al, ABB, AB; Feb. 8, 1999; pp. 48–51.

Submersible Motors and Wet–Rotor Motors for Centrifugal Pumps Submerged in the Fluid Handled; K.. Bienick, KSB; Feb. 25, 1988; pp. 9–17.

High Voltage Generators; G. Beschastnov et al; 1977; vol. 48. No. 6 pp. 1–7.

Eine neue Type von Unterwassermotoren; Electrotechnik und Maschinenbam, 49; Aug. 1931; pp. 2–3.

Problems in design of the 110–5OokV high–voltage generators; Nikiti et al; World Electrotechnical Congress; Jun. 21–27, 1977; Section 1. Paper #18.

Manufacture and Testing of Roebel bars; P. Marti et al; 1960. Pub. 86, vol. 8, pp. 25–31.

Hydroalternators of 110 to 220 kV Elektrotechn. Obz., vol. 64, No. 3, pp. 132–136 Mar. 1975; A. Abramov.

Design Concepts for an Amorphous Metal Distribution Transformer; E. Boyd et al; IEEE Nov. 1984.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol. 59, No. 12, pp. 35–40, 1988.

Zur Entwicklung der Tauchpumpenmotoren; A. Schanz; KSB, pp. 19–24.

Direct Generation of alternating current at high voltages; R. Parsons; IEEE Journal, vol. 67 #393, Jan. 15, 1929; pp. 1065–1080.

Stopfbachslose Umwalzpumpen– ein wichtiges Element in modernen Kraftwerkbau; H. Holz, KSB 1, pp. 13–19, 1960.

Zur Geschichte der Brown Boveri–Synchron–Maschinen; Vierzig Jahre Generatorbau; Jan.–Feb. 1931 pp. 15–39.

Technik und Anwendung moderner Tauchpumpen; A. Heumann; 1987.

High capacity synchronous generator having no tooth stator; V.S. Kildishev et al; No. 1, 1977 pp. 11–16.

Der Asynchronmotor als Antrieb stopfbcichsloser Pumpen; E. Picmaus; Eletrotechnik und Maschinenbay No. 78, pp. 153–155, 1961.

Low core loss rotating flux transformer; R. F. Krause, et al; American Institute Physics J.Appl.Phys vol. 64 #10 Nov. 1988, pp. 5376–5378.

An EHV bulk Power transmission line Made with Low Loss XLPE Cable;Ichihara et al; 8/92; pp. 3–6.

Underground Transmission Systems Reference Book; 1992; pp. 16–19; pp. 36–45; pp. 67–81.

Power System Stability and Control; P. Kundur, 1994; pp. 23–25;p. 767.

Six phase Synchronous Machine with AC and DC Stator Connections, Part II:Harmonic Studies and a proposed Uninterruptible Power Supply Scheme; R. Schiferl et al.; Aug. 1983 pp. 2694–2701.

Six phase Synchronous Machine with AC and DC Stator Connections, Part 1: Equivalent circuit representation and Steady–State Analysis; R. Schiferl et al; Aug. 1983; pp. 2685–2693.

Reactive Power Compensation; T. Petersson; 1993; pp. 1–23.

Permanent Magnet Machines; K. Binns; 1987; pp. 9–1 through 9–26.

Hochspannungsaniagen for Wechselstrom; 97. Hochspannungsaufgaben an Generatoren und Motoren; Roth et al; 1938; pp. 452–455.

Hochspannungsanlagen for Wechselstrom; 97. Hochspannungsaufgaben an Generatoren und Motoren; Roth et al; Spring 1959, pp. 30–33.

Neue Lbsungswege zum Entwurf grosser Turbogeneratoren bis 2GVA, 6OkV; G. Aicholzer; Sep. 1974, pp. 249–255.

Advanced Turbine–generators—an assessment; A. Appleton, et al; International Conf. Proceedings, Lg HV Elec. Sys. Paris, FR, Aug.–Sep. 1976, vol. I, Section 11–02, pp. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

Powerformer ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp. 330–334.

Development of extruded polymer insulated superconducting cable; Jan. 1992.

Transformer core losses; B. Richardson; Proc. IEEE May 1986, pp. 365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

* cited by examiner

MOUNTING DEVICE FOR ROTATING ELECTRIC MACHINES

TECHNICAL FIELD

The present invention relates in a first aspect to a mounting device for reducing short-circuiting forces that are transmitted from a stator core to a stator body in a rotating electric machine.

In a second aspect the present invention relates to a rotating electric machine incorporating mounting devices of the above-mentioned type.

The invention is applicable to rotating electric machines such as synchronous machines and normal asynchronous machines. The invention is also applicable to other electric machines such as dual-fed machines, and to applications in asynchronous static current converter cascades, outerpole machines and synchronous flow machines provided their windings are made up of insulated electric conductors, preferably operating at high voltages. By high voltages is meant in the first places electric voltages in excess of 10 kV. A typical working range for the device according to the invention may be of 36 kV–800 kV.

The invention is in the first place intended for use with a high-voltage cable of the type built up of an electric conductor composed of a number of strand parts, a first semiconducting layer surrounding the electric conductor, an insulating layer surrounding the first semiconducting layer, and a second semiconducting layer surrounding the insulating layer, and its advantages are particularly prominent here. The invention refers particularly to such a cable having a diameter within the interval 20–200 mm and a conducting area within the interval 80–3000 mm$^2$.

Such applications of the invention thus constitute preferred embodiments thereof.

BACKGROUND ART

Similar machines have conventionally been designed for voltages in the range 15–30 kV, and 30 kV has normally been considered to be an upper limit. This generally means that a generator must be connected to the power network via a transformer which steps up the voltage to the level of the power network, i.e. in the range of approximately 130–400 kV.

A conductor is known through U.S. Pat. No. 5,036,165, in which the insulation is provided with an inner and an outer layer of semiconducting pyrolized glassfiber. It is also known to provide conductors in a dynamo-electric machine with such an insulation, as described in U.S. Pat. No. 5,066,881 for instance, where a semiconducting pyrolized glassfiber layer is in contact with the two parallel rods forming the conductor, and the insulation in the stator slots is surrounded by an outer layer of semiconducting pyrolized glassfiber. The pyrolized glassfiber material is described as suitable since it retains its resistivity even after the impregnation treatment.

In rotating electric machines the stator core is attached to the stator body by mounting devices.

Conventional mounting devices consist of a guide bar, a beam and a mounting bolt. The guide bar is used to guide the stator lamination segments when laying the plates for the laminated core. The beam is welded into the stator body. The mounting bolt secures the guide bar to the beam and is arranged with the bolt head recessed in the guide bar and attached in the beam by a screw joint. (See FIG. 3.) The mounting bolt is thus shorter than the thickness of the beam. The package with guide bar, bolt and beam is repeated a number of times in peripheral direction of the stator. Since this connection between laminated core and stator body is relatively rigid, forces are transmitted from the stator core to the stator body and the base in the event of a short circuit. Transient short-circuiting forces are thus transmitted directly into the base. Furthermore, the manufacturing procedure for conventional mounting devices is relatively complicated and expensive. A specially-manufactured bolt is used, for instance.

SUMMARY OF THE INVENTION

The object of the present invention is to solve the problems mentioned above. This is achieved with a mounting device for reducing short-circuiting forces that are transmitted from a stator core to a stator body in a rotating electric machine as described herein, and a rotating electric machine comprising mounting devices of the above type. The rotating electric machine comprises a stator. The stator core is composed of a number of packs, each of which includes a number of metal sheets, or of a number of metal sheets, each pack or metal sheet having two identical grooves arranged for cooperation with wedge members designed to joint together packs or metal sheets. The stator body comprises beams, each connected to a wedge member. The mounting device according to the present invention is characterized in that windings are drawn through slots in the stator, wherein the windings consist of high-voltage cable and that the mounting device comprises a connector arranged through a through-hole in the beam and secured in the wedge member in order to connect the beam and wedge member, wherein the cross-sectional area of said hole at right angles to its longitudinal axis being greater than a cross-sectional area of the connector at right angles to the longitudinal axis of the connector, so as to permit sliding between the wedge member and the beam in the event of short-circuiting.

The mounting device according to the invention greatly reduces the forces transmitted from the stator core to the stator body in the event of short circuits. The mounting device is easy and quick to produce, as well as being relatively inexpensive.

In machines according to the invention the windings are preferably of a type corresponding to cables with solid, extruded insulation, such as those now used for power distribution, e.g. XLPE-cables or cables with EPR-insulation. Such a cable comprises an inner conductor composed of one or more strand parts, an inner semiconducting layer surrounding the conductor, a solid insulating layer surrounding this and an outer semiconducting layer surrounding the insulating layer. Such cables are flexible, which is an important property in this context since the technology for the device according to the invention is based primarily on winding systems in which the winding is formed from cable which is bent during assembly. The flexibility of a XLPE-cable normally corresponds to a radius of curvature of approximately 20 cm for a cable 30 mm in diameter, and a radius of curvature of approximately 65 cm for a cable 80 mm in diameter. In the present application the term "flexible" is used to indicate that the winding is flexible down to a radius of curvature in the order of four times the cable diameter, preferably eight to twelve times the cable diameter.

The winding should be constructed to retain its properties even when it is bent and when it is subjected to thermal stress during operation. It is vital that the layers retain their adhesion to each other in this context. The material properties of the layers are decisive here, particularly their elasticity and relative coefficients of thermal expansion. In a XLPE-cable, for instance, the insulating layer consists of cross-linked, low-density polyethylene, and the semiconducting layers consist of polyethylene with soot and metal particles mixed in. Changes in volume as a result of temperature fluctuations are completely absorbed as changes in radius in the cable and, thanks to the comparatively slight difference between the coefficients of thermal expansion in the layers in relation to the elasticity of these materials, the radial expansion can take place without the adhesion between the layers being lost.

The material combinations stated above should be considered only as examples. Other combinations fulfilling the conditions specified and also the condition of being semiconducting, i.e. having resistivity within the range of $10^{-1}$–$10^6$ ohm-cm, e.g. 1–500 ohm-cm, or 10–200 ohm-cm, naturally also fall within the scope of the invention.

The insulating layer may consist, for example, of a solid thermoplastic material such as low-density polyethylene (LDPE), high-density polyethylene (HDPE), polypropylene (PP), polybutylene (PB), polymethyl pentene (PMP), cross-linked materials such as cross-linked polyethylene (XLPE), or rubber such as ethylene propylene rubber (EPR) or silicon rubber.

The inner and outer semiconducting layers may be of the same basic material but with particles of conducting material such as soot or metal powder mixed in.

The mechanical properties of these materials, particularly their coefficients of thermal expansion, are affected relatively little by whether soot or metal powder is mixed in or not—at least in the proportions required to achieve the conductivity necessary according to the invention. The insulating layer and the semiconducting layers thus have substantially the same coefficients of thermal expansion.

Ethylene-vinyl-acetate copolymers/nitrile rubber, butyl graft polyethylene, ethylene-butyl-acrylate-copolymers and ethylene-ethyl-acrylate copolymers may also constitute suitable polymers for the semiconducting layers.

Even when different types of material are used as base in the various layers, it is desirable for their coefficients of thermal expansion to be substantially the same. This is the case with combination of the materials listed above.

The materials listed above have relatively good elasticity, with an E-modulus of E<500 MPa, preferably <200 MPa.

The elasticity is sufficient for any minor differences between the coefficients of thermal expansion for the materials in the layers to be absorbed in the radial direction of the elasticity so that no cracks appear, or any other damage, and so that the layers are not released from each other. The material in the layers is elastic, and the adhesion between the layers is at least of the same magnitude as the weakest of the materials.

The conductivity of the two semiconducting layers is sufficient to substantially equalize the potential along each layer. The conductivity of the outer semiconducting layer is sufficiently large to enclose the electrical field in the cable, but sufficiently small not to give rise to significant losses due to currents induced in the longitudinal direction of the layer.

Thus, each of the two semiconducting layers essentially constitutes one equipotential surface and the winding, with these layers, will substantially enclose the electrical field within it.

There is, of course, nothing to prevent one or more additional semiconducting layers being arranged in the insulating layer.

The above mentioned and other advantageous embodiments of the present invention are stated in the dependent Claims.

The invention will now be described in more detail with reference to preferred embodiments thereof and to the accompanying drawings.

DETAILED DESCRIPTION OF EMBODIMENTS OF THE PRESENT INVENTION

Figure 1:
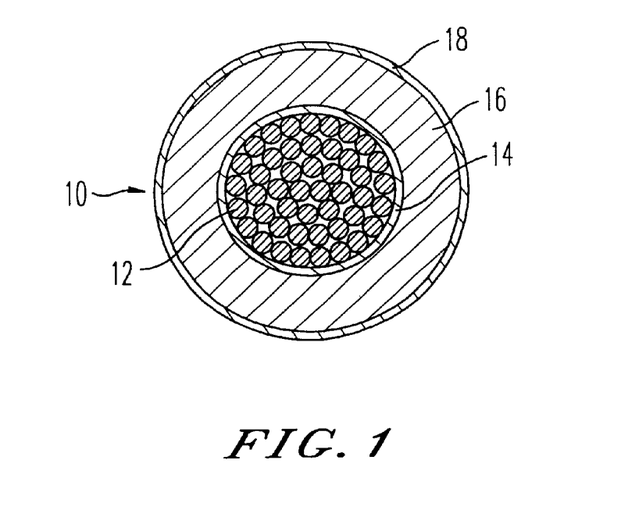
FIG. 1 shows a cross section through a high-voltage cable.

FIG. 1 shows a cross section through a high-voltage cable 10 used traditionally for transmitting electric power. The high-voltage cable 10, illustrated may be a standard XLPE cable, for instance, 145 kV, but without sheath or screen. The high-voltage cable 10 consists of an electric conductor composed of one or more strand parts 12 made of copper (Cu), for instance, and having circular cross section. These strand parts are arranged in the middle of the cable 10. Around the strand parts 12 is a first semiconducting layer 14. Around the first semiconducting layer 14 is a first insulating layer 16, e.g. XLPE-insulation, and around the first insulating layer 16 is a second semiconducting layer 18.

Figure 2:
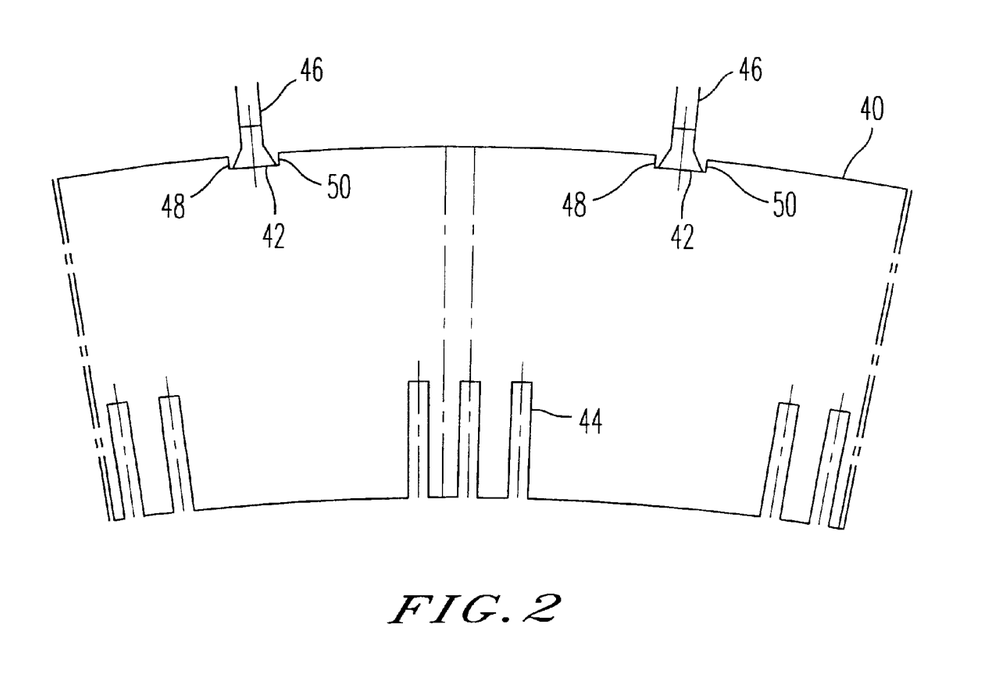
FIG. 2 shows a side view of a pack and a part of a wedge member included in a stator core.

FIG. 2 shows a side view of a pack and a part of a wedge member included in a stator core. This figure has been included in order to explain the technical environment of the mounting device according to the invention and facilitate understanding of the problems existing with conventional mounting devices. (See FIG. 3). Each pack 40 comprises a number of metal sheets joined together. The metal sheets may have a thickness of 0.35–0.50 mm, for instance. Each pack 40 comprises some 50–100 metal sheets which have been glued together, for instance. Each pack 40 is provided with two identical grooves 42 arranged along the outer, long side of the pack 40. As is evident from FIG. 2, the inner and outer long sides of the pack 40 have different radii of curvature so that when the packs 40 are fitted together to form a stator core (magnetic laminated core), this will be cylindrical. The packs 40 also include a number of slots 44 arranged around the inner long side of the pack 40. These slots 44 are intended for the stator windings in the finished stator core. The stator core also comprises wedge members 46 (shown only partially) arranged on the stator body (not shown, see FIGS. 3 and 4), the end of said member which is illustrated having dovetail-shaped cross section. The wedge member need not have dovetail-shaped cross section. It may instead have two protrusions symmetrical in relation to the longitudinal axis of the wedge member. The grooves 42 arranged along the outer long side of the pack 40 have one inclined flank 48 and one straight, perpendicular flank 50. As is evident in FIG. 2, both the inclined flanks 48 face the same way. The entrance to the groove 42 is also wider than the greatest width of the wedge member 46. The main reason for this design of the groove 42 is that the packs 40, comprising 50–100 metal sheets glued together, cannot be bent as is the case with individual metal sheets. When assembling a stator core, a pack 40 is positioned by both the wedge members 46 being inserted into the slots 42 and the packs 40 pushed to the right in this case, so that the inclined flanks 48 are in contact with the dovetailed shape of the wedge members 46. The pack 40 is thereby secured against clockwise movement in tangential direction. The next, partially overlapping pack 40 to be fitted is first mirror-inverted so that the inclined flanks 48 of the grooves 42 are on the right instead of the left side of the grooves 42. The mirror-inverted pack 40 is then positioned by the two wedge members 46 being inserted in the slots 42 and the pack 40 pushed to the left in this case so that the inclined flanks 48 are in contact with the dovetailed shape of the wedge members 46. This pack is thereby secured against counter-clockwise movement in tangential direction. Arranging a locking device at the transition between packs in different layers ensures their being locked against tangential movement in both directions. This locking device may consist of a spot weld.

It should also be pointed out that the stator core need not be build up of packs as shown in FIG. 2, but may instead be formed of metal sheets stacked on top of, and partially overlapping each other. However, this does not affect the present invention.

Figure 3:
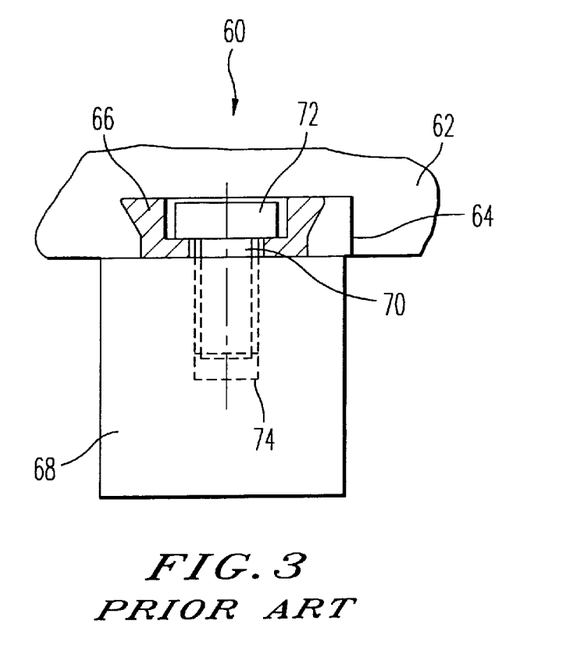
FIG. 3 shows a side view, partially in cross section, of a mounting device according to the state of the art.

FIG. 3 shows a side view, partially in cross section, of a mounting device according to the state of the art. The mounting device 60 is used to connect stator core and stator body. A part of the stator core is shown with the pack 62 (shown only partially). (See FIG. 2.) FIG. 3 also shows a groove 64 in the pack 62, which groove 64 is designed for receipt of a wedge member 66 having dovetail-shaped cross section. In FIG. 3 the wedge member 66 is already inserted into the groove 64, with one end of the wedge member 66 in contact with the inclined flange of the groove 64. (See FIG. 2.) The mounting device 60 according to the state of the art comprises the wedge member 66, the beam 68 and the bolt 70. The wedge member 66 or, as it is also termed, the guide bar is used as described above to guide the laminated stator segments when laying the plates for the laminated core. The beam 68 is in turn welded into the stator body (not shown). The wedge member 66 is provided with a recess for the bolt head 72. This recess is produced by spot facing. The beam 68 is provided with a hole tapped at one end so that the bolt 70 can be secured by a screw joint 74. When the mounting device 60 is in place the bolt 70 is firmly tightened and the beam 68 thus abuts the pack 62 and the wedge member 66. Since the beam 68 is welded into the stator body, the connection between stator core and stator body is substantially rigid and transient short-circuiting forces are thus transmitted directly into the base, these forces being transmitted from stator core to stator body and base. Specially-manufactured bolts 70 are used in the mounting device 60 according to the state of the art. The mounting device 60 is repeated a number if times around the periphery of the stator.

Figure 4:
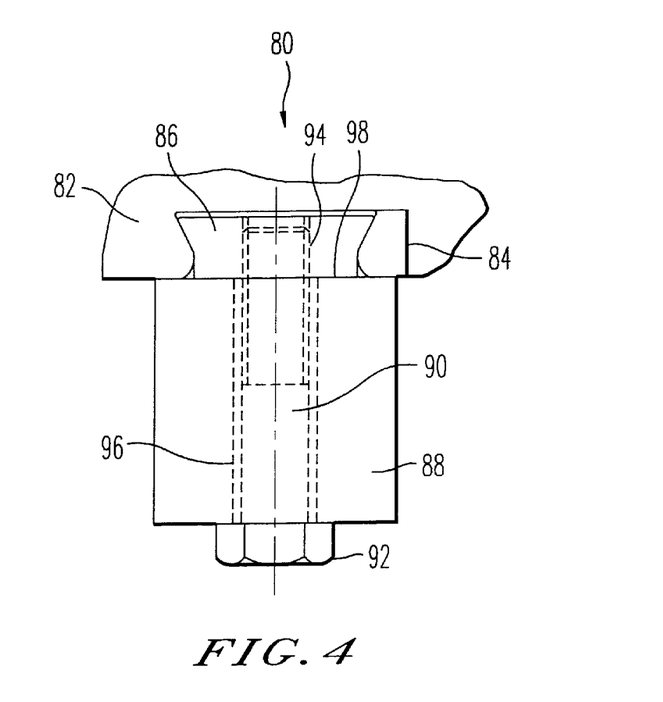
FIG. 4 shows a side view of a mounting device according to the present invention.

FIG. 4 shows a side view, partially in cross section, of a mounting device according to the present invention. The mounting device 80 according to the present invention is also used to connect stator core and stator body. A part of the stator core is shown with the pack 82 (shown only partially). (See FIG. 2.) FIG. 4 also shows a groove 84 in the pack 82, which groove 84 is designed for receipt of a wedge member 86 having dovetail-shaped cross section. In FIG. 4 the wedge member 86 is already inserted into the groove 84, with one end of the wedge member 86 in contact with the inclined flange of the groove 84. (See FIG. 2.) The mounting device 80 according to the present invention comprises the wedge member 86, the beam 88 and a connector 90. The wedge member 86 or, as it is also termed , the guide bar is used as described above to guide the laminated stator segments when laying the plates for the laminated core. The beam 88 is in turn welded into the stator body (not shown). As can be seen in FIG. 4, the connector 90 is arranged in a through-hole 96 in the beam 88 so that the connector 90 extends through the beam 88. The connector 90 is also secured in the wedge member 86 by means of a screw joint 94, for instance. The connector 90 connects the beam 88 and wedge member 86 in such a way as to permit sliding between the wedge member 86 and the beam 88 in the event of short-circuiting. This sliding occurs at the sliding surface (friction surface) 98. Thus the forces arising at short-circuiting are transmitted to the stator body to a greatly reduced extent. In the example shown in FIG. 4 the connector 90 consists of a bolt 90 with bolt head 92 in contact with the beam 88, its threading in engagement with internal threading arranged in the wedge member 86 to form a screw joint 94. As can be seen in FIG. 4, the through-hole 96 in the beam 88, perpendicular to its longitudinal axis, has a cross-sectional area greater than the corresponding cross-sectional area of the bolt 90 (not the bolt head 92). A comparison between FIGS. 3 and 4 clearly indicates that the bolt 90 used in the mounting device 80 according to the present invention is longer than the bolt 70 used in the mounting device 60 according to the state of the art.

Several advantages are obtained with a mounting device 80 according to the invention as compared with a mounting device 60 according to the state of the art:

The forces occurring at short-circuiting are transmitted to a considerably lesser extent to the stator body.

A long bolt maintains pre-stressing in friction surfaces better and for a longer time than a short bolt. The pre-stressing is retained even if subsidence occurs in the contact surfaces.

Given the same sliding length, the flexural stresses in the bolt will be lower.

The solution according to the present invention is less expensive than the conventional solution for the following reasons:
   No spot facing occurs in the guide bar (wedge member)
   Threading in the guide bar is considerably less expensive to produce than threading in the beam since guide bars are tapped in the workshop and are easy to handle
   Inexpensive standard bolts are used instead of specially-manufactured bolts.

The present invention is also suitable for a stator core that is not built up of packs but instead consists of individual metal sheets laid one on top of the other with overlap in such a way that the grooves in the metal sheets guide facing surfaces of the dovetail-shaped wedge member.

The invention is not limited to the embodiment shown. Several modifications are feasible within the scope of the appended claims.

What is claimed is:

1. A mounting device for reducing short-circuiting forces transmitted from a stator core to a stator body in a rotating electric machine wherein the stator core is formed of a number of packs, each of which includes at least one metal sheet each having two identical grooves, a wedge member for cooperation with the grooves to join together said metal sheets, and wherein the stator body comprises a plurality of beams each having at least one through hole, each connected to a wedge member, wherein windings are drawn through slots in the stator, the windings comprising a high-voltage cable and the mounting device comprises a connector arranged through each through-hole in each beam and secured in the wedge member in order to connect each beam and wedge member, wherein the cross-sectional area of the hole at right angles to its longitudinal axis being greater than the cross-sectional area of the connector at right angles to the longitudinal axis of the connector, permitting sliding between the wedge member and the beam in the event of short-circuiting.

2. A mounting device as claimed in claim 1, wherein the high-voltage cable comprises an electric conductor having at least one conductive strand, a first semiconducting layer surrounding the electric conductor, an insulating layer surrounding the first semiconducting layer, and a second semiconducting layer surrounding the insulating layer.

3. A mounting device as claimed in claim 2, wherein the high-voltage cable has a diameter of about 20 mm to about 200 mm and a conducting area of about 80 mm$^2$ to about 3000 mm$^2$.

4. A mounting device as claimed in claim 2, wherein the winding is flexible and said layers adhere to each other.

5. A mounting device as claimed in claim 4, wherein said layers of said high-voltage cable comprise materials having an elasticity and a coefficient of thermal expansion such that a change in volume in the layers caused by temperature fluctuations during operation is absorbed by the elasticity of the materials so that the layers retain their adhesion to each other at the temperature fluctuations occurring during operation.

6. A mounting device as claimed in claim 5, wherein the materials in said layers have an E-modulus less than about 500 MPa.

7. A mounting device as claimed in claim 5, wherein the coefficients of thermal expansion for the materials in said layers are of substantially the same magnitude.

8. A mounting device as claimed in claim 5, wherein an adhesion between the layers is of at least a same magnitude as a strength of a weakest of the materials.

9. A mounting device as claimed in claim 5, wherein each of the semiconducting layers comprises an equipotential surface.

10. A mounting device as claimed in claim 5, wherein the materials in said layers have an E-modulus less than about 200 MPa.

11. A mounting device as claimed in claim 1, comprising a screw joint for securing the connector in the wedge member.

12. A mounting device as claimed in claim 11, wherein the connector comprises a bolt, having a tapped end for engagement with screw threads in the wedge means, and an end of the bolt being formed with a head being for abutment against the beam.

13. A mounting device as claimed in claim 1, wherein a plurality of the mounting devices are repeated a number of times around the periphery of the stator.

14. A mounting device as claimed in claim 1, wherein the cable comprises a conductive core and an electric field confining insulating covering surrounding the core.

15. A rotating electric machine, comprising:
a stator core having stator slots, the stator core formed from a number of packs, each pack including at least two metal sheets having two identical grooves;
a stator body including a plurality of beams, each beam having at least one through-hole and being connected to a wedge member by a mounting device, the wedge members being configured to cooperate with the grooves to join the number of packs together; and
a winding of a high-voltage cable drawn through the stator slots, wherein
the mounting device is configured to reduce short-circuiting forces transmitted from the stator core to the stator body and includes a connector arranged through the through-hole and secured in the wedge member to connect the wedge member to the beam,
a cross-sectional area of the through-hole at a right angle to a longitudinal axis of the through-hole being greater than a crossed-sectional area of the connector at a right angle to a longitudinal axis of the connector such that sliding between the wedge member and the beam is permitted during short-circuiting.

* * * * *

UNITED STATES PATENT AND TRADEMARK OFFICE
CERTIFICATE OF CORRECTION

PATENT NO.    : 6,429,563 B1
DATED         : August 6, 2002
INVENTOR(S)   : Rothman et al.

It is certified that error appears in the above-identified patent and that said Letters Patent is hereby corrected as shown below:

<u>Title page,</u>
Item [30], Foreign Application Priority Data should read:

-- [30]        Foreign Application Priority Data

Feb. 3, 1997    (SE)………………….. 9700357-8 --

Signed and Sealed this

Seventh Day of January, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,429,563 B1 Page 1 of 1
DATED : August 6, 2002
INVENTOR(S) : Rothman et al.

It is certified that error appears in the above-identified patent and that said Letters Patent is hereby corrected as shown below:

<u>Title page,</u>
Item [86], should read as follows:
-- [86]  PCT No.      PCT/SE98/00167

§371 (c)(1),
(2),(4) Date:    Oct. 25, 1999 --

Signed and Sealed this

Eighteenth Day of May, 2004

JON W. DUDAS
*Acting Director of the United States Patent and Trademark Office*